US012412589B2

(12) United States Patent
Mosayyebpour Kaskari et al.

(10) Patent No.: US 12,412,589 B2
(45) Date of Patent: Sep. 9, 2025

(54) SIGNAL LEVEL-INDEPENDENT SPEECH ENHANCEMENT

(71) Applicant: Synaptics Incorporated, San Jose, CA (US)

(72) Inventors: Saeed Mosayyebpour Kaskari, Irvine, CA (US); Atabak Pouya, Irvine, CA (US)

(73) Assignee: Synaptics Incorporated, San Jose, CA (US)

( * ) Notice: Subject to any disclaimer, the term of this patent is extended or adjusted under 35 U.S.C. 154(b) by 176 days.

(21) Appl. No.: 18/351,239

(22) Filed: Jul. 12, 2023

(65) Prior Publication Data

US 2025/0022479 A1 Jan. 16, 2025

(51) Int. Cl.
*G10L 21/02* (2013.01)

(52) U.S. Cl.
CPC .................................... *G10L 21/02* (2013.01)

(58) Field of Classification Search
None
See application file for complete search history.

(56) References Cited

U.S. PATENT DOCUMENTS

| | | | | |
|---|---|---|---|---|
| 2009/0238373 | A1 | 9/2009 | Klein | |
| 2023/0094630 | A1* | 3/2023 | Zhang | G06V 10/82 704/226 |
| 2023/0162750 | A1* | 5/2023 | Murgai | G10L 21/0208 704/231 |
| 2023/0206941 | A1* | 6/2023 | Olsson | G10L 25/78 704/200 |

FOREIGN PATENT DOCUMENTS

| | | | |
|---|---|---|---|
| CN | 113436636 | A | 9/2021 |
| KR | 19990056810 | A | 7/1997 |
| KR | 20170052056 | A | 5/2017 |
| KR | 20180115984 | A | 10/2018 |

(Continued)

OTHER PUBLICATIONS

International Search Report and Written Opinion dated Oct. 24, 2024, received in PCT/US2024/037350, filed Jul. 10, 2024.

(Continued)

*Primary Examiner* — Antim G Shah
(74) *Attorney, Agent, or Firm* — Paradice & Li LLP

(57) ABSTRACT

This disclosure provides methods, devices, and systems for audio signal processing. The present implementations more specifically relate to speech enhancement techniques that are agnostic to varying signal levels in near-end audio signals. In some aspects, a speech enhancement system may include a delay estimator, an input normalizer, and an acoustic echo and noise (AEN) decoupling filter. The delay estimator receives a near-end audio signal via a microphone and a far-end audio signal for output via a speaker and estimates a reference audio signal based on a delay between the near-end audio signal and the far-end audio signal. The input normalizer normalizes a loudness of the near-end audio signal and the reference audio signal. The AEN decoupling filter determines a set of masks based on the normalized audio signals and suppresses an echo component and a noise component of the near-end audio signal based on the set of masks.

16 Claims, 6 Drawing Sheets

(56) References Cited

FOREIGN PATENT DOCUMENTS

| | | | |
|---|---|---|---|
| KR | 20230084236 | A | 6/2023 |
| WO | 2022158912 | A1 | 7/2022 |

OTHER PUBLICATIONS

U.S. Appl. No. 18/460,442, filed Sep. 1, 2023, pp. 1-40.
International Search Report and Written Opinion dated Dec. 17, 2024, received in PCT/US2024/044261, filed Aug. 28, 2024.
Jang et al., "Categorical Reparameterization with Gumbel-Softmax," arXiv preprint arXiv:1611.01144v1, Nov. 3, 2016, pp. 1-13.
Knapp et al., "The Generalized Correlation Method for Estimation of Time Delay," IEEE Trans. Signal Process, vol. 24, No. 4, pp. 320-327, Aug. 1976.
Paleologu et al., "An Overview on Optimized NLMS Algorithms for Acoustic Echo Cancellation," EURASIP Journal on Advances in Signal Processing, vol. 2015, No. 1, pp. 1-19, 2015.

* cited by examiner

SIGNAL LEVEL-INDEPENDENT SPEECH ENHANCEMENT

TECHNICAL FIELD

The present implementations relate generally to audio signal processing, and specifically to signal level-independent speech enhancement techniques.

BACKGROUND OF RELATED ART

Many hands-free communication devices (such as voice over Internet protocol (VOIP) phones, speakerphones, and mobile phones configured to operate in a handsfree mode) include microphones and speakers that are located in relatively close proximity to one another. The microphones are configured to convert sound waves from the surrounding environment into audio signals (also referred to as "near-end" audio signals) that can be transmitted, over a communications channel, to a far-end device. The speakers are configured to convert audio signals received from the far-end device into sound waves that can be heard by a near-end user. Due to the proximity of the speakers and microphones, the near-end audio signals may include a speech component (representing audio originating from the near-end user), an echo component (representing audio emitted by the speakers), and a noise component (representing ambient audio from the background environment).

Acoustic echo cancellation (AEC) refers to various techniques that attempt to cancel or suppress the echo component of the near-end audio signal. Many existing AEC techniques rely on linear transfer functions that approximate the impulse response between a speaker and a microphone. For example, the linear transfer function may be determined using an adaptive filter (such as a normalized least mean square (NLMS) algorithm) that models the acoustic coupling (or channel) between the speaker and the microphone. However, the converge rate of the NLMS algorithm may depend on double-talk conditions (such as where the near-end user and far-end user speak at the same time) and changes to the echo path. Moreover, such linear transfer functions cannot account for nonlinearities introduced along the echo path by amplifiers and various mechanical components of the speaker. Thus, there is a need to further improve the quality of speech in near-end audio signals.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method of speech enhancement. The method includes steps of receiving a first audio signal via a microphone; receiving a second audio signal for output via a speaker; estimating a reference audio signal based on a delay between the first audio signal and the second audio signal; normalizing a loudness of each of the first audio signal and the reference audio signal; determining one or more masks based on the normalized first audio signal and the normalized reference audio signal; and suppressing an echo component and a noise component of the first audio signal based at least in part on the one or more masks.

Another innovative aspect of the subject matter of this disclosure can be implemented in a speech enhancement system, including a processing system and a memory. The memory stores instructions that, when executed by the processing system, cause the speech enhancement system to receive a first audio signal via a microphone; receive a second audio signal for output via a speaker; estimate a reference audio signal based on a delay between the first audio signal and the second audio signal; normalize a loudness of each of the first audio signal and the reference audio signal; determine one or more masks based on the normalized first audio signal and the normalized reference audio signal; and suppress an echo component and a noise component of the first audio signal based at least in part on the one or more masks.

BRIEF DESCRIPTION OF THE DRAWINGS

The present implementations are illustrated by way of example and are not intended to be limited by the figures of the accompanying drawings.

DETAILED DESCRIPTION

Figure 1:
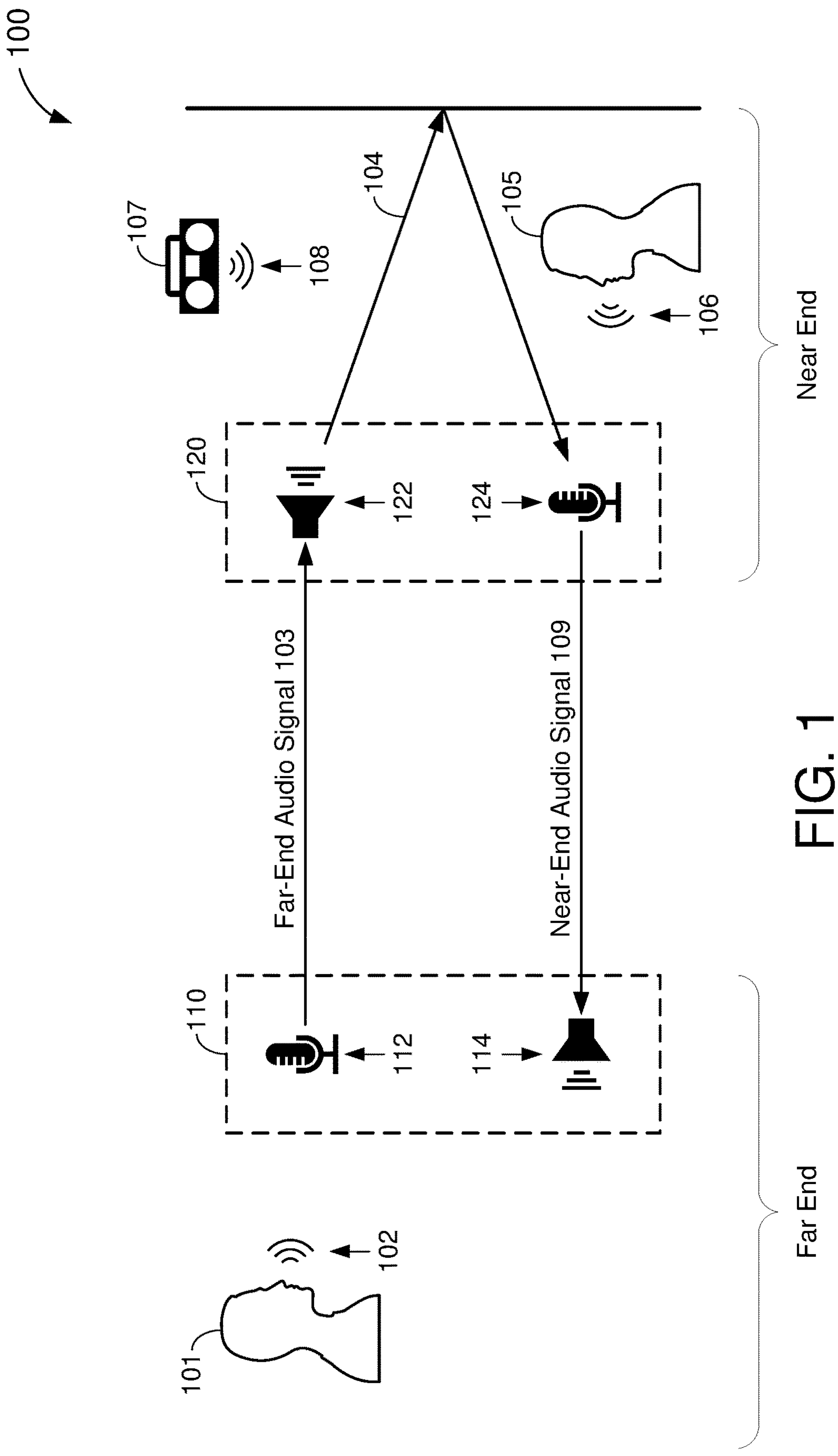
FIG. 1 shows an example hands-free communication system.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

As described above, many hands-free communication devices include microphones and speakers that are located in relatively close proximity to one another. As such, near-end audio signals captured by the microphones may include a speech component (representing audio originating from a near-end user), an echo component (representing audio emitted by the speakers), and a noise component (representing ambient audio from the background environment). Acoustic echo cancellation (AEC) refers to various techniques that attempt to cancel or suppress the echo component of the near-end audio signal. Many existing AEC techniques rely on linear transfer functions that approximate the impulse response between a speaker and a microphone. However, such linear transfer functions cannot account for nonlinearities introduced along the echo path by amplifiers and various mechanical components of the speakers.

Some modern AEC techniques rely on machine learning to separate the speech component of near-end audio signals from the echo and noise components to produce an enhanced audio signal that estimates the clean speech signal. Machine learning, which generally includes a training phase and an inferencing phase, is a technique for improving the ability of a computer system or application to perform a certain task. During the training phase, a machine learning system is provided with one or more "answers" and a large volume of raw training data associated with the answers. The machine learning system analyzes the training data to learn a set of rules that can be used to describe each of the one or more answers. During the inferencing phase, the machine learning system may infer answers from new data using the learned set of rules. Unlike linear AEC filters, machine learning models can be trained to account for nonlinear distortions along the echo path.

Machine learning systems used for AEC are often trained to process audio signals in the time-frequency domain (also referred to as "spectrograms"). An audio signal that is captured in the time domain can be converted to a spectrogram using a short-time Fourier transform (STFT). Spectrograms can be represented by complex matrices having a magnitude component and a phase component. Many existing machine learning systems are trained only on the magnitude components of the spectrograms, while reusing the phase information from the noisy input signals, to produce the enhanced audio signals. However, the phase of the noisy input signal can deviate significantly from the phase of the clean speech signal, particularly when the input signal has low signal-to-noise ratio (SNR). As a result, machine learning systems that are trained only on the magnitude component of each spectrogram can often produce inaccurate estimates of the clean speech signal.

Moreover, the magnitudes (or loudness) of the input audio signals used for inferencing may differ from the magnitudes of the input audio signals used for training the machine learning system. For example, such variations in loudness may be caused by the near-end user increasing (or decreasing) the volume at which the far-end audio signal is played back by the speaker or by the near-end user speaking louder (or quieter) into the microphone. When the magnitude of the input audio signal is too low, speech may become distorted in the enhanced audio signal. On the other hand, when the magnitude of the input audio signal is too high, a substantial amount of noise or echo may leak into the enhanced audio signal. Aspects of the present disclosure recognize that the accuracy of inferences produced by a machine learning system can be improved by normalizing the loudness of the input audio signals.

Various aspects relate generally to audio signal processing, and more particularly, to speech enhancement techniques that are agnostic to varying signal levels in near-end audio signals. In some aspects, a speech enhancement system may include a delay estimator, an input normalizer, and an acoustic echo and noise (AEN) decoupling filter. The delay estimator receives a near-end audio signal via a microphone and a far-end audio signal for output via a speaker and estimates a reference audio signal based on a delay between the near-end audio signal and the far-end audio signal. The input normalizer is configured to normalize a loudness of the near-end audio signal and normalize a loudness of the reference audio signal.

The AEN decoupling filter is configured to determine a set of masks based on the normalized near-end audio signal and the normalized reference audio signal and to suppress the echo component and the noise component of the near-end audio signal based on the set of masks. In some aspects, the AEN decoupling filter may include a neural network trained to infer a number of outputs based on the normalized near-end audio signal and the normalized reference audio signal. In such aspects, the AEN decoupling filter may determine the set of masks based on the outputs inferred by the neural network. In some implementations, the outputs may be inferred based at least in part on a phase of the normalized near-end audio signal and a phase of the normalized reference audio signal.

Particular implementations of the subject matter described in this disclosure can be implemented to realize one or more of the following potential advantages. By normalizing the loudness of the near-end audio signal and the reference audio signal used for speech enhancement, aspects of the present disclosure can further improve the quality of speech in near-end audio signals independent of the signal levels of any of the original audio signals. In other words, the speech enhancement techniques of the present disclosure may be agnostic to varying signal levels of the near-end audio signal or discrepancies between the signal levels of input audio signals used for inferencing and the signal levels of input audio signals used for training a machine learning system (such as the neural network). By also providing the phases of the normalized audio signals as inputs to the neural network, aspects of the present disclosure may further improve the quality of speech in the enhanced audio signal.

FIG. 1 shows an example hands-free communication system 100. The system 100 includes a set of communication devices 110 and 120 that are communicatively coupled via a wired or wireless communication channel (not shown for simplicity). More specifically, the first communication device 110 is located in a far end environment (also referred to as the "far-end device") and the second communication device 120 is located in a near end environment (also referred to as the "near-end device").

The far-end device 110 includes a microphone 112 and a speaker 114. The microphone 112 is configured to detect acoustic waves propagating through the far end environment. In the example of FIG. 1, such acoustic waves may include speech 102 from a user 101 in the far-end environment (also referred to as the "far-end user"). The microphone 112 converts the detected acoustic waves to an electrical signal 103 (also referred to as the "far-end audio signal) representative of the acoustic waveform. The far-end device 110 is configured to transmit the far-end audio signal 103 to the near-end device 120 and receive a near-end audio signal 109 from the near-end device 120. The speaker 114 is configured to convert the near-end audio signal 109 to acoustic sound waves that can be heard in the far end environment.

The near-end device 120 includes a speaker 122 and a microphone 124. The speaker 122 is configured to convert the far-end audio signal 103 to acoustic sound waves 104 that can be heard in the near end environment. The microphone 124 is configured to detect acoustic waves propagating through the near end environment. In the example of FIG. 1, such acoustic waves may include the acoustic waves 104 output by the speaker 122 (also referred to as "acoustic echoes"), speech 106 from a user 105 in the near-end environment (also referred to as the "near-end user"), and ambient noise 108 produced by one or more background audio sources 107. The microphone 124 converts the detected acoustic waves to the near-end audio signal 109 that is transmitted to the far-end device 110.

The acoustic echoes 104 and background noise 108 may mix with and distort the user speech 106 detected by the microphone 124. As a result, the near-end audio signal 109 may include a speech component (representing the user speech 106), an echo component (representing the acoustic echoes 104), and a noise component (representing the background noise 108). In some aspects, the near-end device 120 may improve the quality of speech in the near-end audio signal 109 (also referred to as "speech enhancement") by suppressing the echo and noise components of the near-end audio signal 109 or otherwise increasing the signal-to-echo ratio (SER) and the signal-to-noise ratio (SNR) of the near-end audio signal 109. As a result, the near-end audio signal 109 may include a relatively unaltered copy of the speech component with only minor (if any) residuals of the echo and noise components.

Figure 2:
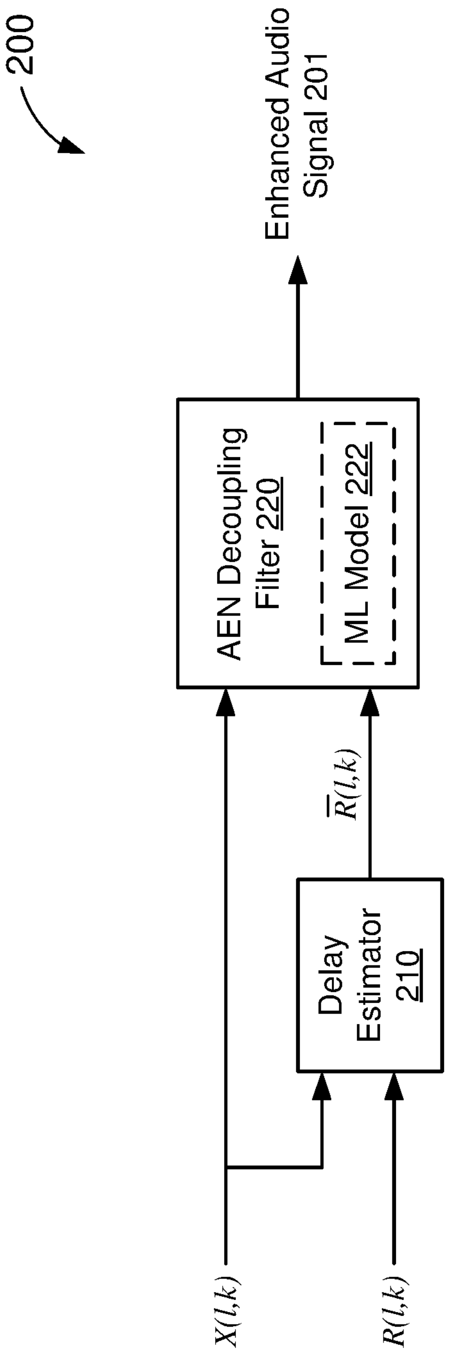
FIG. 2 shows a block diagram of an example speech enhancement system, according to some implementations.

FIG. 2 shows a block diagram of an example speech enhancement system 200, according to some implementations. The speech enhancement system 200 is configured to receive a near-end audio signal (X(l, k)) and a far-end audio signal (R(l, k)) and produce an enhanced audio signal 201 based on the received audio signals X(l, k) and R(l, k). More specifically, the speech enhancement system 200 may produce the enhanced audio signal 201 by suppressing acoustic echo and noise in the near-end audio signal X(l, k).

In some implementations, the near-end audio signal X(l, k) and the far-end audio signal R(l, k) may be examples of the near-end audio signal 109 and the far-end audio signal 103, respectively, of FIG. 1. For example, the near-end audio signal X(l, k) may include a speech component (S(l, k)), an echo component (E(l, k)), and a noise component (V(l, k)), where l is a frame index and k is a frequency index associated with a time-frequency domain:

$$X(l,k)=S(l,k)+E(l,k)+V(l,k) \tag{1}$$

With reference for example to FIG. 1, the speech component S(l, k) may represent the user speech 106, the echo component E(l, k) may represent the acoustic echoes 104, and the noise component V(l, k) may represent the background noise 108.

The speech enhancement system 200 includes a delay estimator 210 and an acoustic echo and noise (AEN) decoupling filter 220. The delay estimator 210 is configured to estimate a delay (δ) between the near-end audio signal X(l, k) and the far-end audio signal R(l, k) and produce a reference audio signal ($\overline{R}$(l, k)) based on the estimated delay, where $\overline{R}$(l, k)=R(l−δ, k). As described with reference to FIG. 1, the acoustic echoes 104 detected by the microphone 124 represent a delayed version of the far-end audio signal 103. More specifically, the echo component E(l, k) of the near-end audio signal X(l, k) can be described as a function of the far-end audio signal R(l, k):

$$E(l, k) = f(R(l, k))H(l, k) \tag{2}$$

where f(•) is a nonlinear function that describes the effects of the speaker 122 on the near-end audio signal R(l, k), and H(l, k) is the acoustic transfer function between the speaker 122 and the microphone 124.

In some implementations, the delay estimator 210 may estimate the delay δ between the near-end audio signal X(l, k) and the far-end audio signal R(l, k) based on a generalized cross-correlation phase transform (GCC-PHAT) algorithm. For example, the audio signals R(l, k) and X(l, k) can be expressed as time-domain signals $x_1(t)$ and $x_2(t)$, respectively:

$$x_1(t) = s(t) + n_1(t)$$

$$x_2(t) = \alpha s(t + D) + n_2(t)$$

where s(t) represents the far-end speech component in each of the audio signals $x_1(t)$ and $x_2(t)$; $n_1(t)$ and $n_2(t)$ represent the noise components in the audio signals $x_1(t)$ and $x_2(t)$, respectively; a is an attenuation factor associated with the second audio signal $x_2(t)$; and D is the delay (in the time domain) between the first audio signal $x_1(t)$ and the second audio signal $x_2(t)$.

Aspects of the present disclosure recognize that the time-domain delay D can be determined by computing the cross correlation ($R_{x_1x_2}(\tau)$ of the audio signals $x_1(t)$ and $x_2(t)$:

$$R_{x_1x_2}(\tau) = E[x_1(t)x_2(t - \tau)]$$

where E[•] is the expected value, and the value of t that maximizes $R_{x_1x_2}(\tau)$ provides an estimate of the time-domain delay D (and thus, the delay δ in the time-frequency domain).

The AEN decoupling filter 220 is configured to produce the enhanced audio signal 201 based on the near-end audio signal X(l, k) and the reference audio signal $\overline{R}$(l, k). For example, in some implementations, the enhanced audio signal 201 may include only the speech component S(l, k) of the near-end audio signal X(l, k). In some aspects, the AEN decoupling filter 220 may decouple the echo component E(l, k) from the noise component V(l, k) of the near-end audio signal X(l, k). More specifically, the AEN decoupling filter 220 may decompose the near-end audio signal X(l, k) into a first audio signal that includes only the speech component S(l, k), a second audio signal that includes only the echo component E(l, k), and a third audio signal that includes only the noise component V(l, k). In some aspects, the AEN decoupling filter 220 may use the component audio signals to further suppress acoustic noise and echo in the near-end audio signal X(l, k).

In some implementations, the AEN decoupling filter 220 may decompose the near-end audio signal X(l, k) into the component audio signals based on a machine learning (ML) model 222. As described above, machine learning generally includes a training phase and an inferencing phase. During the training phase, a machine learning system is provided with one or more "answers" and a large volume of raw training data associated with the answers. The machine learning system analyzes the training data to learn a set of rules (also referred to as the "machine learning model") that can be used to describe each of the one or more answers. During the inferencing phase, the machine learning system may infer answers from new data using the learned set of rules. Unlike linear AEC filters, machine learning models can be trained to account for nonlinearities along the echo path.

Figure 3:
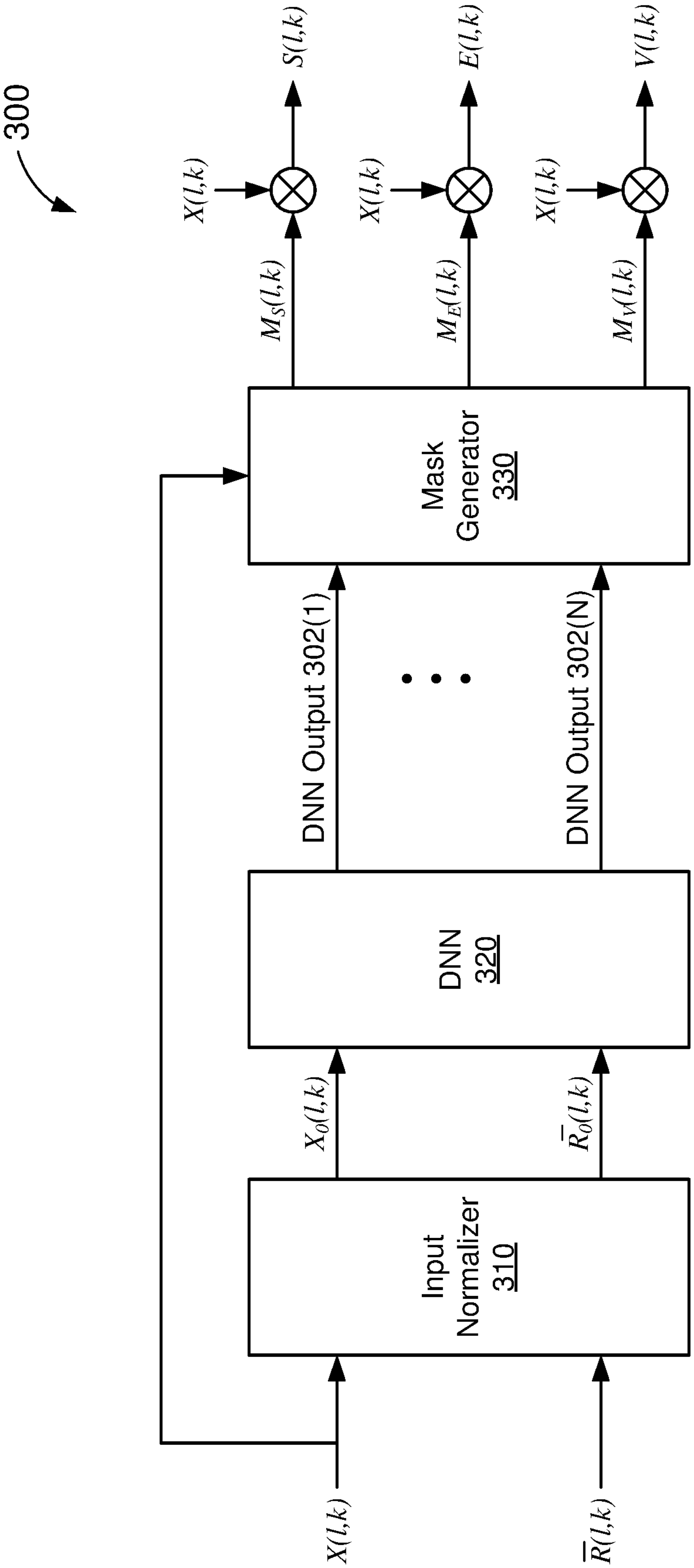
FIG. 3 shows a block diagram of an example acoustic echo and noise (AEN) decoupling system, according to some implementations.

FIG. 3 shows a block diagram of an example acoustic echo and noise (AEN) decoupling system 300, according to some implementations. The AEN decoupling system 300 is configured to receive a near-end audio signal X(l, k) and a reference audio signal $\overline{R}$(l, k) and produce a set of component audio signals S(l, k), E(l, k), and V(l, k) based on the received audio signals X(l, k) and $\overline{R}$(l, k). In some implementations, the AEN decoupling system 300 may be one example of the AEN decoupling filter 220 of FIG. 2.

The AEN decoupling system 300 includes an input normalizer 310, a deep neural network (DNN) 320 and a mask generator 330. The input normalizer 310 is configured to produce a normalized near-end audio signal ($X_0$(l, k)) and a normalized reference audio signal ($\overline{R}_0$(l, k)) based on the near-end audio signal X(l, k) and the reference audio signal $\overline{R}$(l, k) (also referred to as the "input audio signals"). More specifically, the input normalizer 310 may normalize a loudness (or magnitude) of each of the input audio signals X(l, k) and $\overline{R}$(l, k) over a number (K) of frequency bins, where 0≤k≤K−1. In some implementations, the input normalizer 310 may further map a magnitude of the normalized near-end audio signal (|$X_0$(l, k)|) and a magnitude of the normalized reference audio signal (|$\overline{R}_0$(l, k)|) to a logarithmic domain:

$$|X_0(l, k)| = \log\left(\frac{|X(l, k)|}{\sum_{k=0}^{K-1}|X(l, k)|}\right) \tag{3}$$

$$|\overline{R}_0(l, k)| = \log\left(\frac{|\overline{R}(l, k)|}{\sum_{k=0}^{K-1}|\overline{R}(l, k)|}\right) \tag{4}$$

where |X(l, k)| and |$\overline{R}$(l, k)| are the magnitudes of the input audio signals X(l, k) and $\overline{R}$(l, k), respectively.

In some implementations, the input normalizer 310 may provide the magnitudes |$X_0$(l, k)| and |$\overline{R}_0$(l, k)| of the normalized audio signals as inputs to the DNN 320. In some other implementations, the input normalizer 310 may further provide a phase of the normalized near-end audio signal ($\Phi_X$(l, k)) and a phase of the normalized reference audio signal ($\Phi_R$(l, k)) as additional inputs to the DNN 320. Aspects of the present disclosure recognize that normalizing the loudness of the input audio signals X(l, k) and $\overline{R}$(l, k) does not change the phases of the audio signals. Thus, the input normalizer 310 may determine the phases $\Phi_X$(l, k) and $\Phi_R(l, k)$ of the normalized audio signals based on the magnitudes $|X(l, k)|$ and $|\bar{R}(l, k)|$ of the input audio signals:

$$\Phi_X(l, k) = \left[\text{real}\left(\frac{X(l, k)}{|X(l, k)|}\right), imag\left(\frac{X(l, k)}{|X(l, k)|}\right)\right] \quad (5)$$

$$\Phi_R(l, k) = \left[\text{real}\left(\frac{\bar{R}(l, k)}{|\bar{R}(l, k)|}\right), imag\left(\frac{\bar{R}(l, k)}{|\bar{R}(l, k)|}\right)\right] \quad (6)$$

where real(•) and imag(•) represent the real and imaginary components, respectively, of the corresponding complex numbers.

Aspects of the present disclosure further recognize that when the magnitude of the reference audio signal $|\bar{R}(l, k)|$ is equal to zero (such as when playback is paused or muted), the near-end audio signal X(l, k) has no echo component to suppress or cancel. In such implementations, the magnitude and phase of the reference audio signal $\bar{R}_0(l, k)$ also may be set to zero (where $|\bar{R}_0(l, k)|=0$ and $\Phi_R(l, k)=[0,0]$).

The DNN 320 is configured to infer a number (N) of outputs 302(1)-302(N) from the normalized audio signals $X_0(l, k)$ and $\bar{R}_0(l, k)$. Deep learning is a particular form of machine learning in which the inferencing and training phases are performed over multiple layers. Deep learning architectures are often referred to as "artificial neural networks" due to the manner in which information is processed (similar to a biological nervous system). For example, each layer of an artificial neural network may be composed of one or more "neurons." Each layer of neurons may perform a different transformation on the output data from a preceding layer so that the final output of the neural network results in the desired inferences. The set of transformations associated with the various layers of the network is referred to as a "neural network model." In some implementations, the outputs 302(1)-302(N) may be inferred based on the magnitudes $|X_0(l, k)|$ and $|\bar{R}_0(l, k)|$ of the normalized audio signals. In some other implementations, the outputs 302(1)-302(N) may be inferred based on the magnitudes $|X_0(l, k)|$ and $|\bar{R}_0(l, k)|$ and the phases $\Phi_X(l, k)$ and $\Phi_R(l, k)$ of the normalized audio signals.

The mask generator 330 is configured to generate a set of audio masks based on the outputs 302(1)-302(N) of the DNN 320. In some aspects, the set of audio masks may include a speech mask ($M_S(l, k)$) associated with a speech component of the near-end audio signal X(l, k), an echo mask ($M_E(l, k)$) associated with an echo component of the near-end audio signal X(l, k), and a noise mask ($M_V(l, k)$) associated with a noise component of the near-end audio signal X(l, k). The audio masks $M_S(l, k)$, $M_E(l, k)$, and $M_V(l, k)$ can be used to decompose the near-end audio signal X(l, k) into a speech signal S(l, k), an echo signal E(l, k), and a noise signal V(l, k). More specifically, the speech signal S(l, k) may include only the speech component of the near-end audio signal X(l, k), the echo signal E(l, k) may include only the echo component of the near-end audio signal X(l, k), and the noise component V(l, k) may include only the noise component of the near-end audio signal X(l, k).

With reference for example to Equation 1, the AEN decoupling system 300 may apply the audio masks $M_S(l, k)$, $M_E(l, k)$, $M_V(l, k)$ to the near-end audio signal X(l, k) to obtain the component audio signals S(l, k), E(l, k), and V(l, k), respectively:

$$S(l, k) = X(l, k)M_S(l, k) \quad (7)$$

$$E(l, k) = X(l, k)M_E(l, k) \quad (8)$$

$$V(l, k) = X(l, k)M_V(l, k) \quad (9)$$

In some implementations, the DNN 320 may be trained to infer a number (M) of outputs for each component of the near-end audio signal X(l, k) (where N=3*M). In such implementations, the mask generator 330 may use each set of M DNN outputs to produce a respective one of the audio masks $M_S(l, k)$, $M_E(l, k)$, and $M_V(l, k)$. In some other implementations, the DNN 320 may be trained to infer a number (P) of outputs for only two components of the near-end audio signal X(l, k) (where N=2*P). In such implementations, the mask generator 330 may use the DNN outputs 302(1)-302(N) to produce two of the audio masks and may produce the third audio mask based on the other two audio masks. With reference for example to Equations 1 and 7-9, the audio masks $M_S(l, k)$, $M_E(l, k)$, and $M_V(l, k)$ must sum to 1:

$$X(l, k)M_S(l, k) + X(l, k)M_E(l, k) + X(l, k)M_V(l, k) = X(l, k)M_S(l, k) + M_E(l, k) + M_V(l, k) = 1 \quad (10)$$

Thus, any of the audio masks $M_S(l, k)$, $M_E(l, k)$, or $M_V(l, k)$ can be determined based on a sum of the other two audio masks.

In some implementations, the mask generator 330 may determine the speech mask $M_S(l, k)$ and the echo mask $M_E(l, k)$ based on the DNN outputs 302(1)-302(N) and may further determine the noise mask $M_V(l, k)$ based on the speech mask $M_S(l, k)$ and the echo mask $M_E(l, k)$:

$$M_V(l, k) = 1 - (M_S(l, k) + M_E(l, k)) \quad (11)$$

In such implementations, the DNN 320 can be implemented using a smaller or more compact neural network model (compared to neural network models that are trained to infer outputs associated with all three audio masks). In other words, for a given neural network size, Equation 11 allows the DNN 320 to produce more accurate inferencing results compared to neural network models that are trained to infer outputs associated with all three audio masks.

Figure 4:
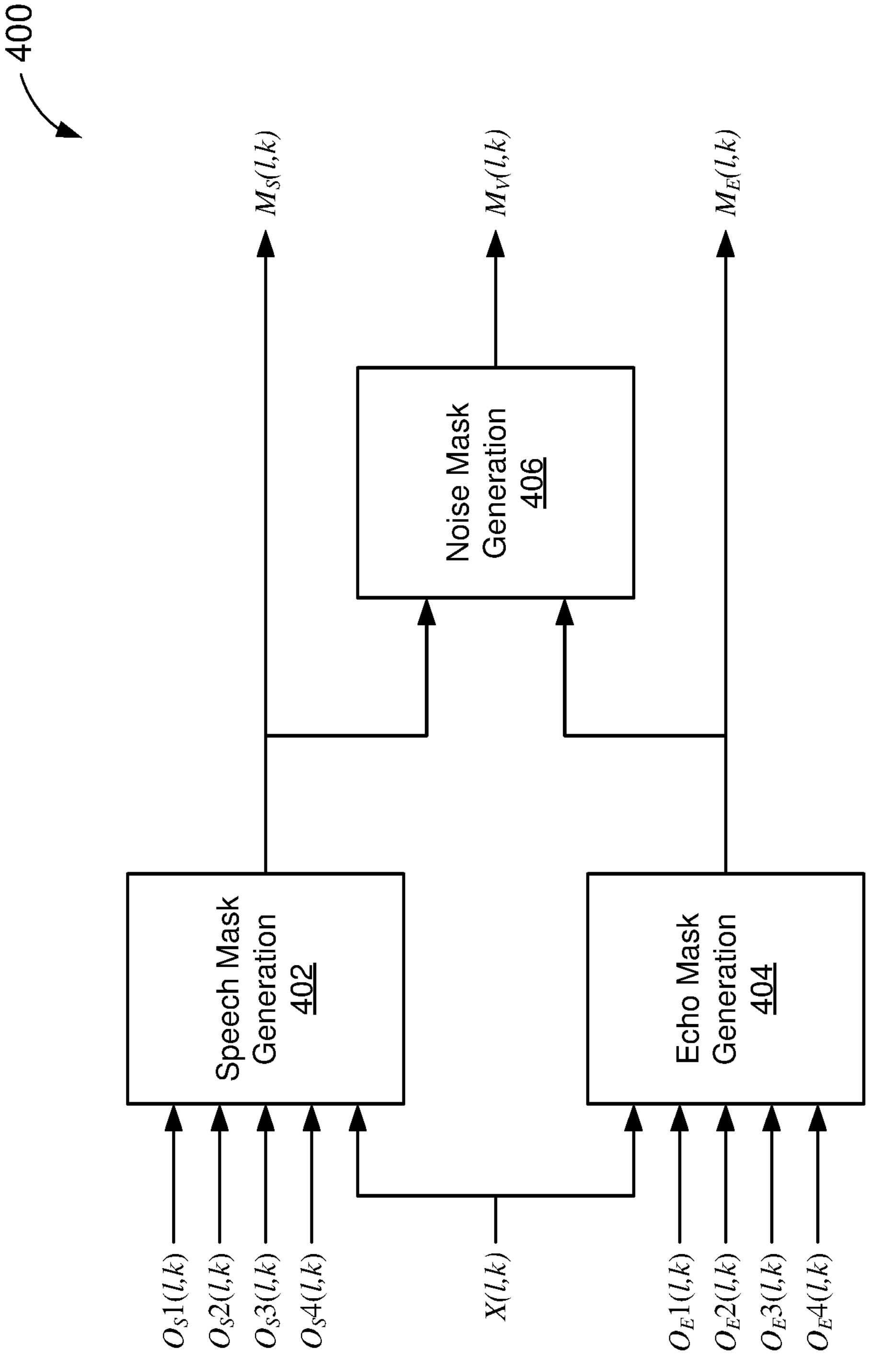
FIG. 4 shows a block diagram of an example audio mask generation system, according to some implementations.

FIG. 4 shows a block diagram of an example audio mask generation system 400, according to some implementations. The audio mask generation system 400 is configured to generate a set of audio masks $M_S(l, k)$, $M_E(l, k)$, or $M_V(l, k)$ based on outputs $O_S1(l, k)$-$O_S4(l, k)$ and $O_E1(l, k)$-$O_E4(l, k)$ of a DNN. In some implementations, the audio mask generation system 400 may be one example of the mask generator 330 of FIG. 3. With reference for example to FIG. 3, the DNN outputs $O_S1(l, k)$-$O_S4(l, k)$ and $O_E1(l, k)$-$O_E4(l, k)$ may be examples of the DNN outputs 302(1)-302(N).

The audio mask generation system 400 includes a speech mask generation component 402, an echo mask generation component 404, and a noise mask generation component 406. In some implementations, the speech mask generation component 402 may generate the speech mask $M_S(l, k)$ based on the DNN outputs $O_S1$-$O_S4$ and a complementary speech mask ($\check{M}_S(l, k)$), where $\check{M}_S(l, k)=1-M_S(l, k)$ and $X(l, k)\check{M}_S(l, k)=E(l, k)+V(l, k)$. More specifically, the speech mask generation component 402 may determine the magnitude of the speech mask ($|M_S(l, k)|$) based on the DNN outputs $O_S1(l, k)$ and $O_S2(l, k)$ and the magnitude of the near-end audio signal $|X(l, k)|$:

$$|M_S(l,k)| = \beta_S(l,k)\sigma_1(Z_S(l,k)) = \frac{\beta_S(l,k)}{1+e^{-Z_S(l,k)}}$$

$$Z_S(l,k) = \tanh\left(\frac{e^{-max(-O_S1(l,k),0)}}{\tilde{X}_n(l,k)}\right)$$

$$\tilde{X}_n(l,k) = \max\left(\frac{|X(l,k)|}{\sum_{k=0}^{K-1}|X(l,k)|}, \varepsilon\right)$$

$$\beta_S(l,k) = \min\left(1+\text{softplus}(O_S2(l,k)), \frac{1}{|\sigma_1(Z_S(l,k)) - \sigma_1(-Z_S(l,k))|}\right)$$

where softplus(•) is a smooth approximation of the rectified linear unit (ReLU) activation function (also referred to as the "softplus function"), $\sigma_1(\bullet)$ is the sum of positive divisors function, and ¿ is a small positive number that is used to avoid division by infinity.

The speech mask generation component 402 also may determine the magnitude of the complementary speech mask ($|\check{M}_S(l, k)|$) based on the DNN outputs $O_S1(l, k)$ and $O_S2(l, k)$ and the magnitude of the near-end audio signal $|X(l, k)|$:

$$|\check{M}_S(l,k)| = \beta_S(l,k)\sigma_1(-Z_S(l,k)) = \frac{\beta_S(l,k)}{1+e^{Z_S(l,k)}}$$

The speech mask generation component 402 may further determine the phase of the speech mask ($\theta_S(l, k)$) based on the magnitude of the speech mask $|M_S(l, k)|$, the magnitude of the complementary speech mask $|\check{M}_S(l, k)|$, and the DNN outputs $O_S3(l, k)$ and $O_S4(l, k)$, where:

$$\cos\theta_S(l,k) = \frac{1+|M_S(l,k)|^2 - |\check{M}_S(l,k)|^2}{2|M_S(l,k)|^2}$$

$$\sin\theta_S(l,k) = \sqrt{1-\cos^2\theta_S(l,k)}$$

$$e^{j\theta_S(l,k)} = \cos\theta_S(l,k) + jb_S(l,k)\sin\theta_S(l,k)$$

$$b_S(l,k) = \begin{cases} 1 & \gamma_S^{(0)}(l,k) > \gamma_S^{(1)}(l,k) \\ -1 & \text{otherwise} \end{cases}$$

$$\gamma_S^{(0)}(l,k) = \frac{e^{\frac{(O_S3(l,k)+g_0)}{\tau}}}{e^{\frac{(O_S3(l,k)+g_0)}{\tau}} + e^{\frac{(O_S4(l,k)+g_1)}{\tau}}}$$

$$\gamma_S^{(1)}(l,k) = \frac{e^{\frac{O_S4(l,k)+g_1}{\tau}}}{e^{\frac{(O_S3(l,k)+g_0)}{\tau}} + e^{\frac{(O_S4(l,k)+g_1)}{\tau}}} = 1-\gamma_S^{(0)}(l,k)$$

where $g_0$ and $g_1$ can be sampled using inverse transform sampling by drawing $u_n$~Uniform(0,1) and computing $g_n=-\log(-\log(u_n))$, $n\in\{0,1\}$.

In some implementations, the echo mask generation component 404 may generate the echo mask $M_E(l, k)$ based on the DNN outputs $O_E1$-$O_E4$ and a complementary echo mask ($\check{M}_E(l, k)$), where $\check{M}_E(l, k)=1-M_E(l, k)$ and $X(l, k)\check{M}_E(l, k)=S(l, k)+V(l, k)$. More specifically, the echo mask generation component 404 may determine the magnitude of the echo mask ($|M_E(l, k)|$) based on the DNN outputs $O_E1(l, k)$ and $O_E2(l, k)$ and the magnitude of the near-end audio signal $|X(l, k)|$:

$$|M_E(l,k)| = \beta_E(l,k)\sigma_1(Z_E(l,k)) = \frac{\beta_E(l,k)}{1+e^{-Z_E(l,k)}}$$

$$Z_E(l,k) = \tanh\left(\frac{e^{-max(-O_E1(l,k),0)}}{\tilde{X}_n(l,k)}\right)$$

$$\beta_E(l,k) = \min\left(1+\text{softplus}(O_E2(l,k)), \frac{1}{|\sigma_1(Z_E(l,k)) - \sigma_1(-Z_E(l,k))|}\right)$$

The echo mask generation component 404 also may determine the magnitude of the complementary echo mask ($|\check{M}_E(l, k)|$) based on the DNN outputs $O_E1(l, k)$ and $O_E2(l, k)$ and the magnitude of the near-end audio signal $|X(l, k)|$:

$$|\check{M}_E(l,k)| = \beta_E(l,k)\sigma_1(-Z_E(l,k)) = \frac{\beta_E(l,k)}{1+e^{Z_E(l,k)}}$$

The echo mask generation component 404 may further determine the phase of the echo mask ($\theta_E(l, k)$) based on the magnitude of the echo mask $|\check{M}_E(l, k)|$, the magnitude of the complementary echo mask $|\check{M}_E(l, k)|$, and the DNN outputs $O_E3(l, k)$ and $O_E4(l, k)$, where:

$$\cos\theta_E(l,k) = \frac{1+|M_E(l,k)|^2 - |\check{M}_E(l,k)|^2}{2|M_E(l,k)|^2}$$

$$\sin\theta_E(l,k) = \sqrt{1-\cos^2\theta_E(l,k)}$$

$$e^{j\theta_E(l,k)} = \cos\theta_E(l,k) + jb_E(l,k)\sin\theta_E(l,k)$$

$$b_E(l,k) = \begin{cases} 1 & \text{if } \gamma_E^{(0)}(l,k) > \gamma_E^{(1)}(l,k) \\ -1 & \text{otherwise} \end{cases}$$

$$\gamma_E^{(0)}(l,k) = \frac{e^{\frac{(O_E3(l,k)+g_0)}{\tau}}}{e^{\frac{(O_E3(l,k)+g_0)}{\tau}} + e^{\frac{(O_E4(l,k)+g_1)}{\tau}}}$$

$$\gamma_E^{(1)}(l,k) = \frac{e^{\frac{O_E4(l,k)+g_1}{\tau}}}{e^{\frac{(O_E3(l,k)+g_0)}{\tau}} + e^{\frac{(O_E4(l,k)+g_1)}{\tau}}} = 1-\gamma_E^{(0)}(l,k)$$

In some implementations, the noise mask generation component 406 may generate the noise mask $M_V(l, k)$ based on the speech mask $M_S(l, k)$ and the echo mask $M_E(l, k)$. More specifically, the noise mask generation component 406 may generate the noise mask $M_V(l, k)$ based on Equation 11 (such as described with reference to FIG. 3).

Figure 5:
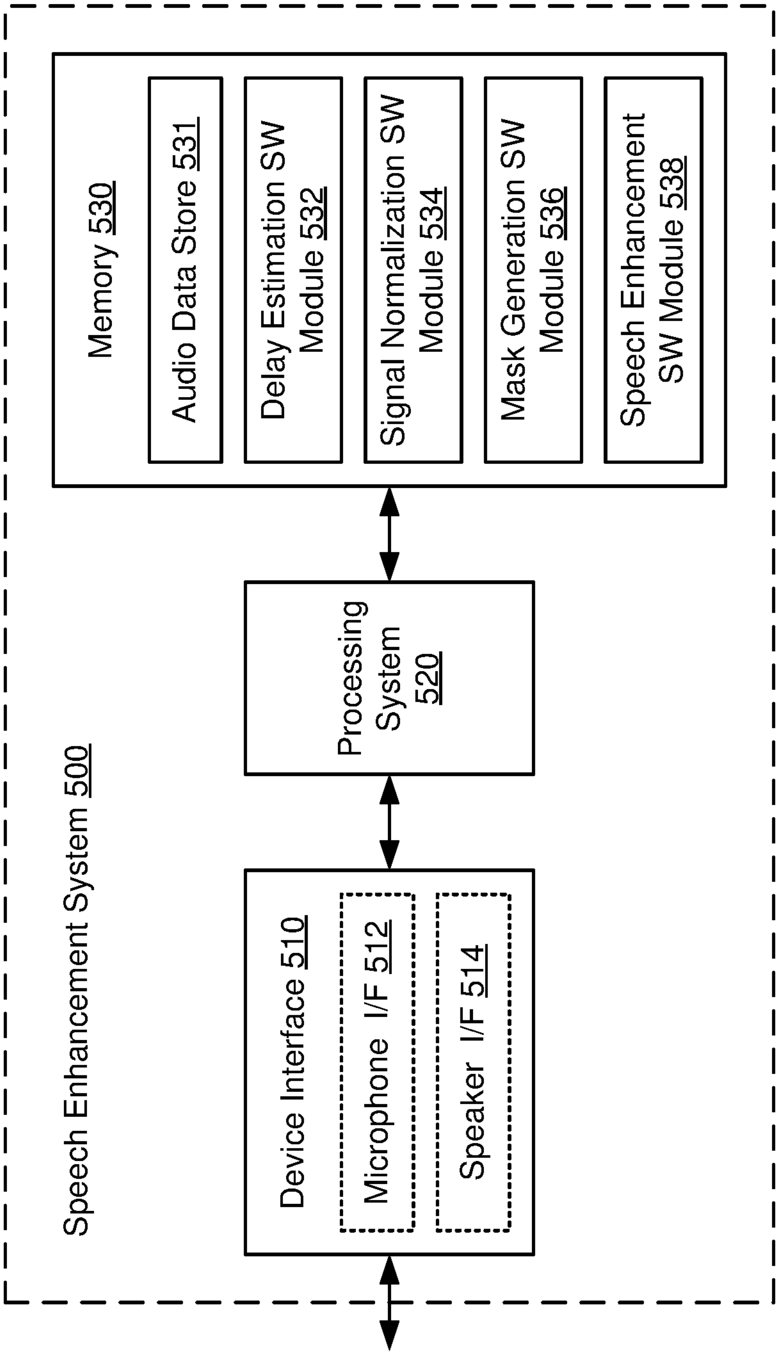
FIG. 5 shows another block diagram of an example speech enhancement system, according to some implementations.

FIG. 5 shows another block diagram of an example speech enhancement system 500, according to some implementations. The speech enhancement system 500 may be configured to produce an enhanced audio signal based on a near-end audio signal and a reference audio signal. In some implementations, the speech enhancement system 500 may be one example of the speech enhancement system 200 of FIG. 2.

The speech enhancement system 500 includes a device interface 510, a processing system 520, and a memory 530. The device interface 510 is configured to communicate with one or more components of an audio communication device (such as the near-end device 120 of FIG. 1). In some implementations, the device interface 510 may include a microphone interface (I/F) 512 and a speaker interface (I/F) 514. The microphone interface 512 is configured to receive the near-end audio signal via a microphone (such as the microphone 124). The speaker interface 514 is configured to receive a far-end audio signal for output via a speaker (such as the speaker 122). For example, the speaker interface 514 may receive the far-end audio signal from a far-end device (such as the far-end device 110).

The memory 530 may include an audio data store 531 configured to store frames of the near-end audio signal and the reference audio signal as well as any intermediate signals that may be produced by the speech enhancement system 500 as a result of producing the enhanced audio signal. The memory 530 also may include a non-transitory computer-readable medium (including one or more nonvolatile memory elements, such as EPROM, EEPROM, Flash memory, or a hard drive, among other examples) that may store at least the following software (SW) modules:

- a delay estimation SW module 532 to estimate the reference audio signal based on a delay between the near-end audio signal and the far-end audio signal;
- a signal normalization SW module 534 to normalize a loudness of each of the near-end audio signal and the reference audio signal;
- a mask generation SW module 536 to determine one or more masks based on the normalized near-end audio signal and the normalized reference audio signal; and
- a speech enhancement SW module 538 to suppress an echo component and a noise component of the near-end audio signal based at least in part on the one or more masks.

Each software module includes instructions that, when executed by the processing system 520, causes the speech enhancement system 500 to perform the corresponding functions.

The processing system 520 may include any suitable one or more processors capable of executing scripts or instructions of one or more software programs stored in the speech enhancement system 500 (such as in the memory 530). For example, the processing system 520 may execute the delay estimation SW module 532 to estimate the reference audio signal based on a delay between the near-end audio signal and the far-end audio signal. The processing system 520 also may execute the signal normalization SW module 534 to normalize a loudness of each of the near-end audio signal and the reference audio signal. The processing system 520 may execute the mask generation SW module 536 to determine one or more masks based on the normalized near-end audio signal and the normalized reference audio signal. Further, the processing system 520 may execute the speech enhancement SW module 538 to suppress an echo component and a noise component of the near-end audio signal based at least in part on the one or more masks.

Figure 6:
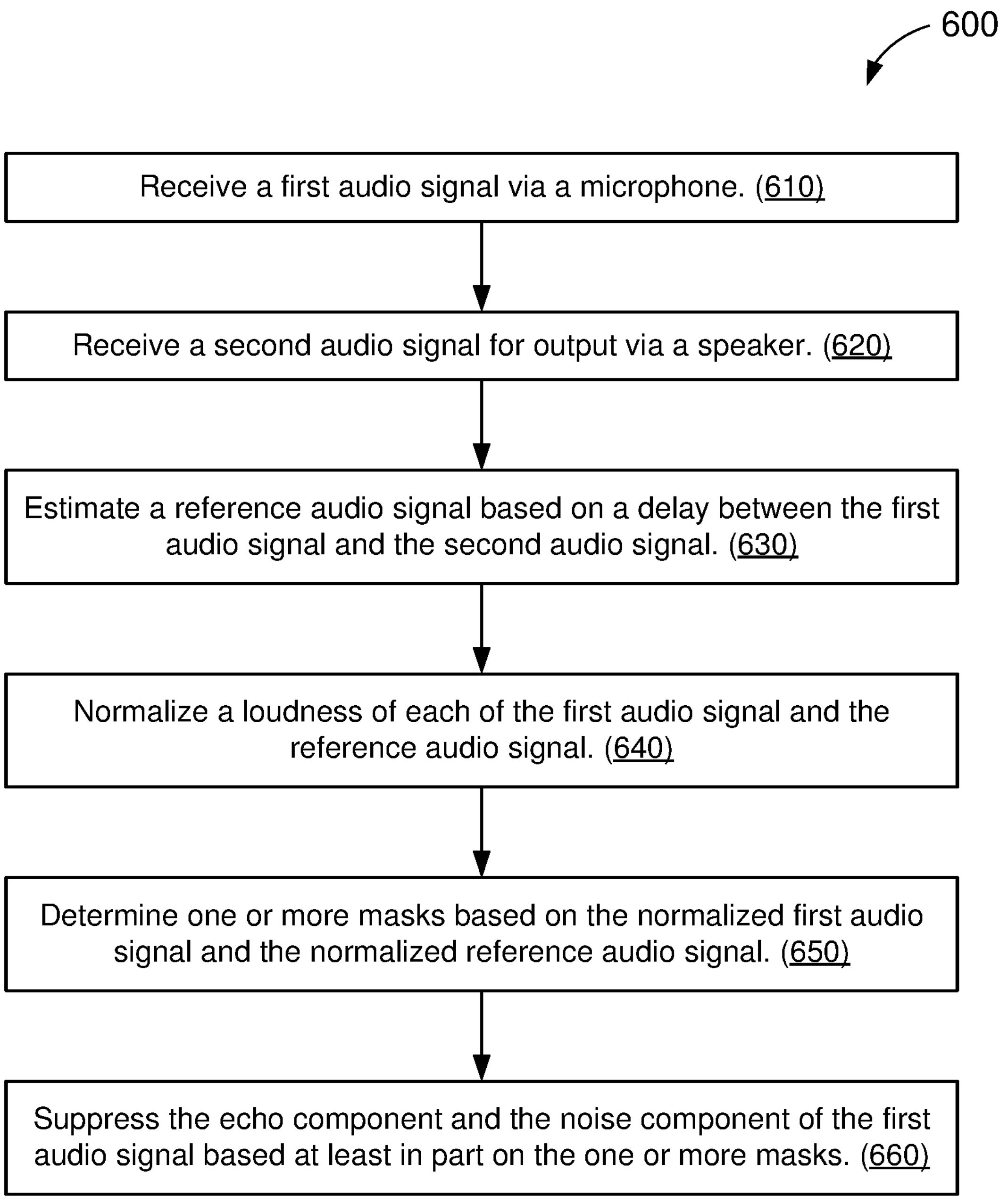
FIG. 6 shows an illustrative flowchart depicting an example operation for speech enhancement, according to some implementations.

FIG. 6 shows an illustrative flowchart depicting an example operation 600 for speech enhancement, according to some implementations. In some implementations, the example operation 600 may be performed by a speech enhancement system such as any of the speech enhancement systems 200 or 500 of FIGS. 2 and 5, respectively.

The speech enhancement system receives a first audio signal via a microphone (610). The speech enhancement system also receives a second audio signal for output via a speaker (620). The speech enhancement system estimates a reference audio signal based on a delay between the first audio signal and the second audio signal (630). The speech enhancement system normalizes a loudness of each of the first audio signal and the reference audio signal (640). The speech enhancement system further determines one or more masks based on the normalized first audio signal and the normalized reference audio signal (650). Still further, the speech enhancement system suppresses an echo component and a noise component of the first audio signal based at least in part on the one or more masks (660).

In some aspects, the normalizing of the loudness of the first audio signal and the reference audio signal may include mapping a magnitude of the first audio signal to a logarithmic domain and mapping a magnitude of the reference audio signal to the logarithmic domain.

In some implementations, the normalizing of the loudness of the first audio signal may include determining a respective magnitude of the first audio signal associated with each of a plurality of frequency bins and determining a magnitude of the normalized first audio signal based at least in part on a sum of the magnitudes of the first audio signal associated with the plurality of frequency bins.

In some implementations, the normalizing of the loudness of the reference audio signal may include determining a respective magnitude of the reference audio signal associated with each of a plurality of frequency bins and determining a magnitude of the normalized reference audio signal based at least in part on a sum of the magnitudes of the reference audio signal associated with the plurality of frequency bins.

In some implementations, the one or more masks may include a speech mask ($M_S$) associated with a speech component of the first audio signal, an echo mask ($M_E$) associated with the echo component of the first audio signal, and a noise mask ($M_V$) associated with the noise component of the first audio signal.

In some aspects, the determining of the one or more masks may include inferring a plurality of outputs from the normalized first audio signal and the normalized reference audio signal based on a neural network model. In some implementations, the plurality of outputs may be inferred based at least in part on a phase of the normalized first audio signal and a phase of the normalized reference audio signal.

In some aspects, the determining of the one or more masks may include estimating the speech mask $M_S$ based at least in part on a first subset of the plurality of outputs and a complementary speech mask ($\check{M}_S$), where $\check{M}_S=1-M_S$; estimating the echo mask $M_E$ based at least in part on a second subset of the plurality of outputs and a complementary echo mask ($\check{M}_E$), where $\check{M}_E=1-M_E$; and determining the noise mask $M_V$ based on the speech mask $M_S$ and the echo mask $M_E$.

In some implementations, the estimating of the speech mask $M_S$ may include determining a magnitude of the speech mask $M_S$ based on the first audio signal and one or more first outputs of the first subset of the plurality of outputs, determining a magnitude of the complementary speech mask $\check{M}_S$ based on the first audio signal and the one or more first outputs, and determining a phase of the speech mask $M_S$ based on the magnitude of the speech mask $M_S$, the magnitude of the complementary speech mask $\check{M}_S$, and one or more second outputs of the first subset of the plurality of outputs.

In some implementations, the estimating of the echo mask $M_E$ may include determining a magnitude of the echo mask $M_E$ based on the first audio signal and one or more first outputs of the second subset of the plurality of outputs, determining a magnitude of the complementary echo mask $\check{M}_E$ based on the first audio signal and the one or more first outputs, and determining a phase of the echo mask $M_E$ based on the magnitude of the echo mask $M_E$, the magnitude of the complementary echo mask $\check{M}_E$, and one or more second outputs of the second subset of the plurality of outputs.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of speech enhancement, comprising:

receiving a first audio signal via a microphone;

receiving a second audio signal for output via a speaker;

estimating a reference audio signal based on a delay between the first audio signal and the second audio signal;

normalizing a loudness of each of the first audio signal and the reference audio signal;

determining one or more masks based on the normalized first audio signal and the normalized reference audio signal, the determining of the one or more masks including:

estimating a speech mask ($M_S$) associated with a speech component of the first audio signal based at least in part on a complementary speech mask ($\check{M}_S$), where $\check{M}_S$=1−M; estimating an echo mask ($M_E$) associated with an echo component of the first audio signal based at least in part on a complementary echo mask ($\check{M}_E$), where $\check{M}_E$=1−$M_E$; and determining a noise mask ($M_V$) associated with a noise component of the first audio signal based on the speech mask $M_S$ and the echo mask $M_E$; and suppressing the echo component and the noise component of the first audio signal based at least in part on the one or more masks.

2. The method of claim 1, wherein the normalizing of the loudness of the first audio signal and the reference audio signal comprises:

mapping a magnitude of the first audio signal to a logarithmic domain; and mapping a magnitude of the reference audio signal to the logarithmic domain.

3. The method of claim 1, wherein the normalizing of the loudness of the first audio signal comprises:

determining a respective magnitude of the first audio signal associated with each of a plurality of frequency bins; and determining a magnitude of the normalized first audio signal based at least in part on a sum of the magnitudes of the first audio signal associated with the plurality of frequency bins.

4. The method of claim 1, wherein the normalizing of the loudness of the reference audio signal comprises:

determining a respective magnitude of the reference audio signal associated with each of a plurality of frequency bins; and determining a magnitude of the normalized reference audio signal based at least in part on a sum of the magnitudes of the reference audio signal associated with the plurality of frequency bins.

5. The method of claim 1, wherein the determining of the one or more masks comprises: inferring a plurality of outputs from the normalized first audio signal and the normalized reference audio signal based on a neural network model.

6. The method of claim 5, wherein the plurality of outputs is inferred based at least in part on a phase of the normalized first audio signal and a phase of the normalized reference audio signal.

7. The method of claim 5 wherein the estimating of the speech mask $M_S$ comprises:

determining a magnitude of the speech mask $M_S$ based on the first audio signal and one or more first outputs of a first subset of the plurality of outputs;

determining a magnitude of the complementary speech mask $\check{M}_S$ based on the first audio signal and the one or more first outputs; and determining a phase of the speech mask $M_S$ based on the magnitude of the speech mask $M_S$, the magnitude of the complementary speech mask $\check{M}_S$, and one or more second outputs of the first subset of the plurality of outputs.

8. The method of claim 5, wherein the estimating of the echo mask $M_E$ comprises:

determining a magnitude of the echo mask $M_E$ based on the first audio signal and one or more first outputs of a second subset of the plurality of outputs;

determining a magnitude of the complementary echo mask $\check{M}_E$ based on the first audio signal and the one or more first outputs; and determining a phase of the echo mask $M_E$ based on the magnitude of the echo mask $M_E$, the magnitude of the complementary echo mask $\check{M}_E$, and one or more second outputs of the second subset of the plurality of outputs.

9. A speech enhancement system comprising:

a processing system; and a memory storing instructions that, when executed by the processing system, causes the speech enhancement system to:

receive a first audio signal via a microphone;

receive a second audio signal for output via a speaker;

estimate a reference audio signal based on a delay between the first audio signal and the second audio signal;

normalize a loudness of each of the first audio signal and the reference audio signal;

determine one or more masks based on the normalized first audio signal and the normalized reference audio signal, the determining of the one or more masks including:

estimating a speech mask ($M_S$) associated with a speech component of the first audio signal based at least in part on a complementary speech mask ($\check{M}_S$), where $\check{M}=1-M_S$;

estimating an echo mask ($M_E$) associated with an echo component of the first audio signal based at least in part on a complementary echo mask ($\check{M}_E$), where $M_E=1-M_E$; and determining a noise mask ($M_V$) associated with a noise component of the first audio signal based on the speech mask $M_S$ and the echo mask $M_E$; and suppress the echo component and the noise component of the first audio signal based at least in part on the one or more masks.

10. The speech enhancement system of claim 9, wherein the normalizing of the loudness of the first audio signal and the reference audio signal comprises:

mapping a magnitude of the first audio signal to a logarithmic domain; and mapping a magnitude of the reference audio signal to the logarithmic domain.

11. The speech enhancement system of claim 9, wherein the normalizing of the loudness of the first audio signal comprises:

determining a respective magnitude of the first audio signal associated with each of a plurality of frequency bins; and determining a magnitude of the normalized first audio signal based on a sum of the magnitudes of the first audio signal associated with the plurality of frequency bins.

12. The speech enhancement system of claim 9, wherein the normalizing of the reference audio signal comprises:

determining a respective magnitude of the reference audio signal associated with each of a plurality of frequency bins; and determining a magnitude of the normalized reference audio signal based on a sum of the magnitudes of the reference audio signal associated with the plurality of frequency bins.

13. The speech enhancement system of claim 9, wherein the determining of the one or more masks comprises:

inferring a plurality of outputs from the normalized first audio signal and the normalized reference audio signal based on a neural network model.

14. The speech enhancement system of claim 13, wherein the plurality of outputs is inferred based at least in part on a phase of the normalized first audio signal and a phase of the normalized reference audio signal.

15. The speech enhancement system of claim 13, wherein the estimating of the speech mask $M_S$ comprises:

determining a magnitude of the speech mask $M_S$ based on the first audio signal and one or more first outputs of a first subset of the plurality of outputs;

determining a magnitude of the complementary speech mask $\check{M}_S$ based on the first audio signal and the one or more first outputs; and determining a phase of the speech mask $M_S$ based on the magnitude of the speech mask $M_S$, the magnitude of the complementary speech mask $\check{M}_S$, and one or more second outputs of the first subset of the plurality of outputs.

16. The speech enhancement system of claim 13, wherein the estimating of the echo mask $M_E$ comprises:

determining a magnitude of the echo mask $M_E$ based on the first audio signal and one or more first outputs of a second subset of the plurality of outputs;

determining a magnitude of the complementary echo mask $\check{M}_E$ based on the first audio signal and the one or more first outputs; and determining a phase of the echo mask $M_E$ based on the magnitude of the echo mask $M_E$, the magnitude of the complementary echo mask $\check{M}_E$, and one or more second outputs of the second subset of the plurality of outputs.

* * * * *